(12) United States Patent
Arakelian et al.

(10) Patent No.: US 9,896,027 B2
(45) Date of Patent: Feb. 20, 2018

(54) ILLUMINATED VEHICLE SOCKET

(71) Applicant: Ark Corporation Pty Ltd, Arndell Park (AU)

(72) Inventors: Richard Arakelian, Arndell Park (AU); Hsuan-chi Kuo, Arndell Park (AU)

(*) Notice: Subject to any disclaimer, the term of this patent is extended or adjusted under 35 U.S.C. 154(b) by 0 days.

(21) Appl. No.: 15/347,029

(22) Filed: Nov. 9, 2016

(65) Prior Publication Data

US 2017/0129395 A1 May 11, 2017

Related U.S. Application Data

(60) Provisional application No. 62/259,112, filed on Nov. 24, 2015.

(30) Foreign Application Priority Data

Nov. 9, 2015 (AU) ................................. 2015904604

(51) Int. Cl.

| | |
|---|---|
| *F21V 8/00* | (2006.01) |
| *B60D 1/64* | (2006.01) |
| *B60Q 1/30* | (2006.01) |
| *B60Q 1/26* | (2006.01) |
| *H01R 13/717* | (2006.01) |
| *H01R 13/447* | (2006.01) |
| *B60Q 1/50* | (2006.01) |
| *G09F 13/00* | (2006.01) |
| *G09F 23/00* | (2006.01) |

(52) U.S. Cl.
CPC ............... *B60Q 1/305* (2013.01); *B60D 1/64* (2013.01); *B60Q 1/2696* (2013.01); *G02B 6/0096* (2013.01); *H01R 13/447* (2013.01); *H01R 13/717* (2013.01); *B60Q 1/2661* (2013.01); *B60Q 1/50* (2013.01); *G09F 13/00* (2013.01); *G09F 23/00* (2013.01)

(58) Field of Classification Search
CPC ........ B60Q 1/305; B60Q 1/2696; B60Q 1/50; B60Q 1/2661; H01R 13/447; H01R 13/717; B60D 1/64; G02B 6/0096; G09F 23/00

See application file for complete search history.

(56) References Cited

U.S. PATENT DOCUMENTS

| | | | | |
|---|---|---|---|---|
| 5,639,246 A | * | 6/1997 | Holmes .................. | H01R 33/46 439/35 |
| 5,765,940 A | * | 6/1998 | Levy ................... | B60Q 1/2696 362/227 |
| 9,694,749 B2 | * | 7/2017 | Lynam ................... | B60R 1/003 |
| 2017/0113502 A1 | * | 4/2017 | Arakelian ............. | B60D 1/605 |

* cited by examiner

*Primary Examiner* — Tracie Y Green
(74) *Attorney, Agent, or Firm* — Braxton, Hilton & Perrone, PLLC

(57) ABSTRACT

An electrical socket is described, which is configured to be mounted on a towing vehicle. The electrical socket comprises a socket body, a plug receiver mounted in the socket body and configured to receive a vehicle electrical plug from a towed vehicle, an illuminated closure mounted on the socket body and movable between a closed position in which the plug receiver is closed and an open position in which the plug receiver is accessible to receive the vehicle electrical plug, the illuminated closure comprising a lens and a light source mounted adjacent the lens and configured to direct light through the lens toward the towed vehicle when it is connected to the towing vehicle wherein the light source is also configured to illuminate the plug receiver when the closure is in the open position.

18 Claims, 19 Drawing Sheets

ILLUMINATED VEHICLE SOCKET

PRIORITY

The present application claims priority to U.S. Provisional Application No. 62/259,112 filed on Nov. 24, 2015, the entirety of which is hereby incorporated by reference. The present application also claims priority to Australian Provisional Application No. 2015904604 filed Nov. 9, 2015, the entirety of which is hereby incorporated by reference.

TECHNICAL FIELD

The present technology relates generally to electrical sockets configured to be mounted on towing vehicles, in particular cars, SUVs, 4WDs and the like, adapted for connecting electrical services to towed vehicles.

BACKGROUND

Vehicle electrical sockets in use are generally mounted at the rear of a towing vehicle, adjacent a tow ball or towing hitch. That position, whether in daylight or at night, is generally in shadow, being underneath a bumper bar or other shelf for protection from weather and accidents. Vehicle indicator, reversing and brake lights can have the effect of amplifying the depth of the shadow.

Given the shadowing of the socket environment, it is difficult and time consuming to locate the socket and mate a plug into it. The plug has several pins in various arrangements and each type of plug pin arrangement requires some precision. Without being able to see the socket's pin receivers, users become frustrated. The time to connect the plug into the socket increases.

Furthermore, increasing the time to mate the plug increases the likelihood of crush injuries and other dangers to a person since the area is not particularly visible to drivers of approaching vehicles or indeed the driver of the towing vehicle itself.

The present inventors seek to provide a new socket.

SUMMARY

In accordance with one aspect of the present invention there is provided an electrical socket configured to be mounted on a towing vehicle, the electrical socket comprising:
  a socket body;
  a plug receiver in the socket body and configured to receive a vehicle electrical plug from a towed vehicle;
  an illuminated closure for closing the plug receiver, the illuminated closure mounted on the socket body and movable between a closed position in which the closure is substantially disposed across the plug receiver to inhibit access thereto, and an open position in which the cover is disposed substantially clear of the plug receiver, the illuminated closure further including:
  a light source mounted on the closure configured to direct light rearward of the socket body and the closure is in the closed position;
  wherein the light source is configured to illuminate the plug receiver at least when the closure is in the open position.

The illuminated closure, in embodiments, is a panel which fires light forward and rearward.

The closure in embodiments is held in an open position so that plug connection and detachment can be a one-handed operation.

In an embodiment the receiver includes a plurality of slots or bores or recesses for receiving electrical plug tabs or plug pins mounted on the electrical plug. In an embodiment there are six slots for receiving six pins of rectangular cross-section. In various other embodiments there are four, five, seven, eight, nine, ten, eleven, twelve, thirteen, fourteen, fifteen or any other suitable plurality of slots or bores, depending on the number of electrical devices to be connected by the plug and socket.

In an embodiment the plug pins have circular cross section.

In an embodiment the plurality of slots or bores are arranged in a circle or ring. In another embodiment the plurality of slots or bores are arranged in a line to suit a cooperating arrangement of pins on the vehicle electrical plug.

In an embodiment the light source includes a printed circuit board (PCB) in electrical communication with the light source so as to receive lighting instructions from the towing vehicle and convey the instructions to the light source. The PCB may also include processors and memory devices for processing the lighting instructions from the towing vehicle or processing other lighting routines stored in the memory device(s). In an embodiment the light source is in electrical communication with the towing vehicle to receive power and instructions for illuminating the illuminated closure. In an embodiment the illuminated closure includes mounts configured to mount the light source.

In an embodiment the light source is mounted on the illuminated closure mounts. In an embodiment the light source includes a plurality of lamps disposed in an array on the closure. In an embodiment the array includes a plurality of lamps disposed along one or more edges of the closure.

In an embodiment the plurality of lamps are light emitting diodes (LEDs) but may be in the form of incandescent globes, compact fluorescent globes, or other suitable lighting arrangement.

In an embodiment the light source includes one or more lenses. In one embodiment the light source includes a diffuser for diffusing the light from the lens and/or the light source. In an embodiment the diffuser includes a light pipe for receiving and diffusing light from the plurality of LEDs. In an embodiment the light pipe includes light inlets at each end to receive light from the plurality of LEDs and a light outlet across a front face of the light pipe.

In an embodiment the diffuser is mounted between the PCB and the lens so that the diffuse light from the diffuser is projected substantially through the lens.

In an embodiment the light source is mounted in a hinged or otherwise pivoting mount so as to vary the attitude of its light, say, when the illuminated closure moves between the open and closed positions, so that the light source illuminates the plug receiver when the closure is in the open position and illuminates the ground or some other selected place when the closure is in the closed position.

In an embodiment the light source includes a forward-firing light source disposed on a back of the closure and directed toward the plug receiver. In an embodiment the forward-firing light source is an LED but it may be in the form of incandescent globes, compact fluorescent globes, or other suitable lighting arrangement.

In an embodiment the forward-firing light source is mounted on a back portion of the PCB and disposed at a selected angle so that the light from the forward-firing light source illuminates the plug receiver when the closure is in the open position.

The illuminated closure could also usefully include rails disposed at the sides of the illuminated closure, the rails being configured to receive the illuminated closure so that it may slide or roll in sections, say, upwardly, between the closed and open positions, or there may equally usefully be other suitable arrangements for moving the closure between the closed and open positions. In that embodiment the light source would be disposed at a base of the illuminated closure so that it would illuminate the plug receiver when the closure has slid upwardly into the open position.

In an embodiment the illuminated closure includes a hinge for moving the illuminated closure from the closed position to the open position. For example, in an embodiment the hinge is mounted at an upper region of the socket body so that the closure hinges upwards and the forward-firing light source fires light downwards and forward into the plug receiver when the closure is in the open position.

In an embodiment the illuminated closure includes a catch for holding the closure in the open position. In an embodiment the catch includes a retainer mounted adjacent the hinge for retaining a portion of the closure. In an embodiment the retainer includes a plurality of retaining teeth to retain a kept portion of the closure when it is in the open position. In an embodiment the kept portion of the closure comprises a plurality of cooperating teeth for cooperating with the retaining teeth when the closure is in the open position. In operation the closure can be deformed to disengage the cooperating teeth from the retaining teeth to release the closure from the open position and move it to the closed position.

There are several alternatives possible which would each do an excellent job of retaining the illuminated closure in the open position or indeed the closed position. One is a bulbous head configured to be retained in a cooperating necked receiver. In that embodiment a stalk with a bulbous head is mounted on the illuminated closure and a necked receiver with flexible arms is mounted on the socket body so as to cooperate with the stalk.

Furthermore there may be a hook and loop arrangement to hold the illuminated closure in the open position; a press stud arrangement; a resilient tab for hooking onto a cooperating portion of the socket body; a buckle; a biased detent, a magnet disposed on the socket body and a cooperating steel or other magnetic element (say, a disc) on the illuminated closure. What is useful to include is a one-handed operation to open the illuminated closure and keep it in the open position, since usually a user has the plug in the other hand.

There may also be provided other suitable retaining or closure catching arrangements, including a friction element wherein a follower runs along a track or a post, and which has an interference or slightly push fit so that a user may select a suitable opening position angle, either part way or the entire way.

In an embodiment the illuminated closure includes a biasing element to bias the closure to the closed position. In an embodiment the biasing element includes a spring and in an embodiment the spring is mounted at the hinge.

There may be provided a living hinge or an oil-canning hinge so that the illuminated closure tends to be repelled from some centre position and is attracted to either the closed position or the open position. There may be a retainer for the closed position.

In an embodiment the lens is translucent to allow light to pass through from the diffuser. In an embodiment the lens includes translucent portions in the shape of messages, images or trade marks so that the light source illuminates the image, message or trade mark to drivers of vehicles approaching from behind the towing vehicle.

In an embodiment the lens includes a lenticular treatment to make the message appear to be animated depending on the angle of viewing by a user. In an embodiment there is provided behind the lens or instead of the lens a display screen, such as an LED screen or an illuminated e-paper screen, or an LCD screen. In an embodiment the PCB includes a processing device and a memory so that the screen may display animated images thereon.

In one embodiment the hinge is mounted at an upper region of the socket body so that the closure hinges upwards to the open position and the forward-firing light source fires light downwards and forward into the plug receiver at least when the closure is in the open position.

In one embodiment the illuminated closure includes a retainer mounted adjacent the hinge for retaining a portion of the closure when the closure is in the open position.

In one embodiment the retainer includes a catch to catch a cooperating element mounted on the closure when the closure is in the open position.

In one embodiment herein the cooperating portion of the closure comprises a catch bar for cooperating with the catch when the closure is in the open position.

In one embodiment the illuminated closure includes a biasing element to bias the closure to the closed position.

In one embodiment the lens includes a lenticular treatment to make the message appear to be animated depending on the angle of viewing by a user.

In one embodiment the illuminated closure includes a hood on a back face of the closure so as to protect the light source.

Advantageously, the embodiments facilitate increased visibility of a vehicle electrical socket to facilitate connection with a towed vehicle electrical plug.

Advantageously, the embodiments increase visibility of advertising messages or trade marks to drivers of vehicles approaching a vehicle from behind (when there is no towed vehicle).

Advantageously, selected embodiments facilitate single-handed operation of plugging and unplugging a plug into a socket body by holding the closure open while the user's hand inserts or detaches the plug.

In another aspect the present technology provides an electrical socket configured to be mounted on a towing vehicle, the electrical socket comprising:

a socket body;

a plug receiver in the socket body and configured to receive a vehicle electrical plug from a towed vehicle;

a closure for closing the plug receiver, the closure mounted on the socket body and movable between a closed position in which the closure is substantially disposed across the plug receiver to inhibit access thereto, and an open position in which the cover is disposed clear of the plug receiver:

wherein a catch is provided, mounted on the socket body for catching a cooperating catch body mounted on the closure to hold the closure in the open position.

BRIEF DESCRIPTION OF THE DRAWINGS

In order to enable a clearer understanding, a preferred embodiment of the technology will now be further explained and illustrated by reference to the accompanying drawings, in which.

DETAILED DESCRIPTION OF A PREFERRED EMBODIMENT

Figure 1:
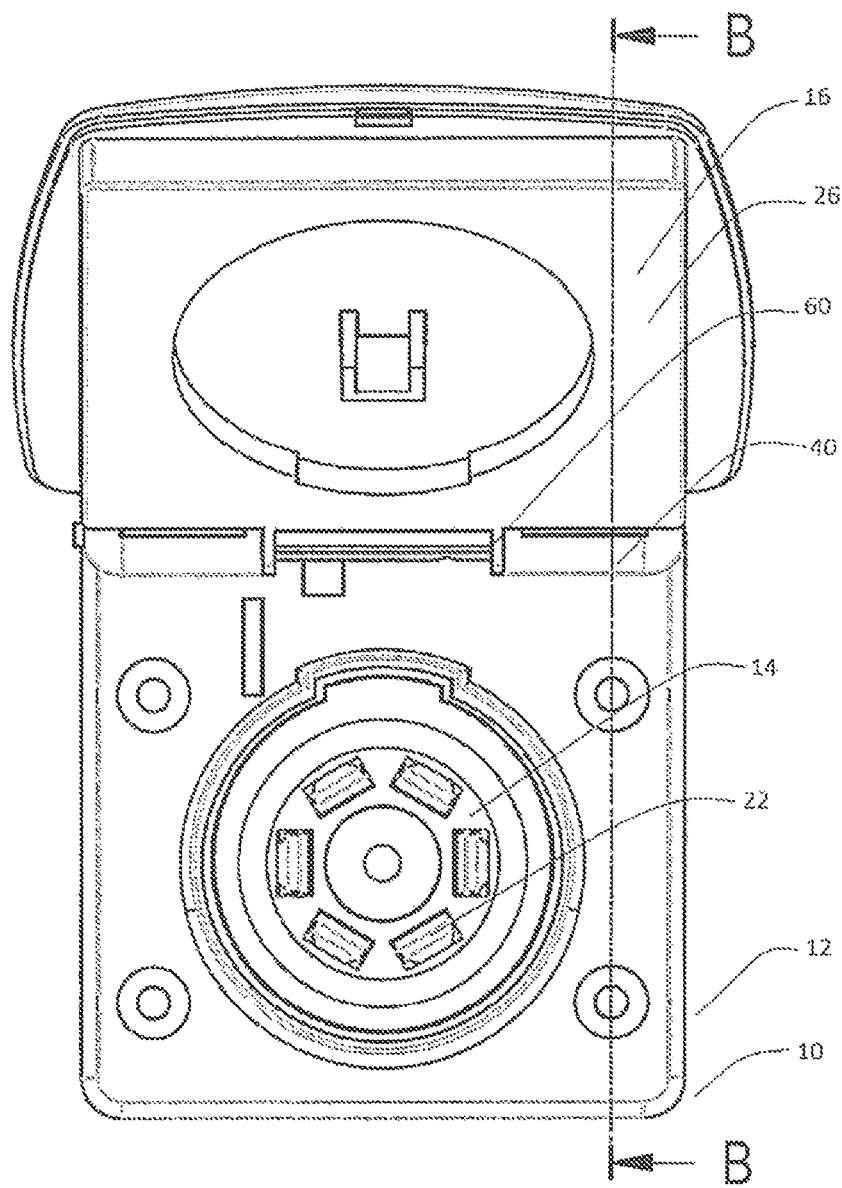
FIG. 1 is a front elevation view of a vehicle electrical socket in accordance with an embodiment, the electrical socket shown with a closure in an open position.

Throughout this specification and the claims that follow, the direction "rear" is intended to denote a direction following a towing vehicle (facing a closure of the socket body), and forward is in an opposite direction.

Referring to FIGS. 1 to 8 there is shown a an electrical socket generally indicated at 10, the electrical socket 10 configured to be mounted on a towing vehicle (not shown), the electrical socket 10 comprising a socket body 12, a plug receiver 14 mounted in the socket body 12 and configured to receive a vehicle electrical plug (not shown) from a towed vehicle. An illuminated closure 16 mounted on the socket body is provided, movable between a closed position (FIG. 4) in which the plug receiver 14 is closed by the closure 16 (disposed substantially across the plug receiver and an open position (FIG. 1) in which the plug receiver 14 is accessible by virtue of having the closure 16 distal or clear of the plug receiver 14 so that the plug receiver 114 can freely receive the vehicle electrical plug therein. The illuminated closure 16 further comprises a lens 18 and a light source 19 mounted adjacent the lens 18 and configured to direct light through the lens 18, and the light source 19 is also configured to illuminate the plug receiver 14 when the illuminated closure 16 is in the open position.

The plug receiver 14 includes a plurality of slots 22 for receiving electrical plug tabs (not shown) mounted on the electrical plug. There are six slots 22 shown for receiving six pins of rectangular cross-section. In another embodiment there are seven bores (FIGS. 9 to 12).

The plurality of slots 22 are arranged in a circle or ring in FIGS. 1 to 8 and in a line in FIGS. 9 to 12.

The light source includes a printed circuit board 24 in electrical communication with the light source 19 so as to receive instructions from the towing vehicle and convey the instructions to the light source 19. The PCB 24 may also include processors for processing the instructions. The light source 19 is in electrical communication with the towing vehicle via cables to receive power and instructions for illuminating the illuminated closure 16. The illuminated closure 16 includes mounts configured to mount the light source 19.

Figure 8:
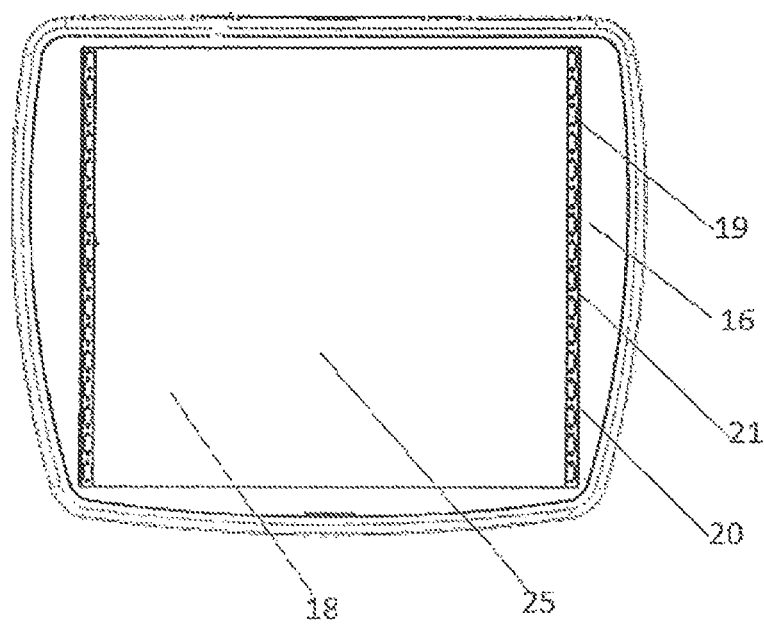
FIG. 8 is a front elevation view of a diffuser showing an arrangement of LEDs at its sides for lighting up the diffuser.
Figure 9:
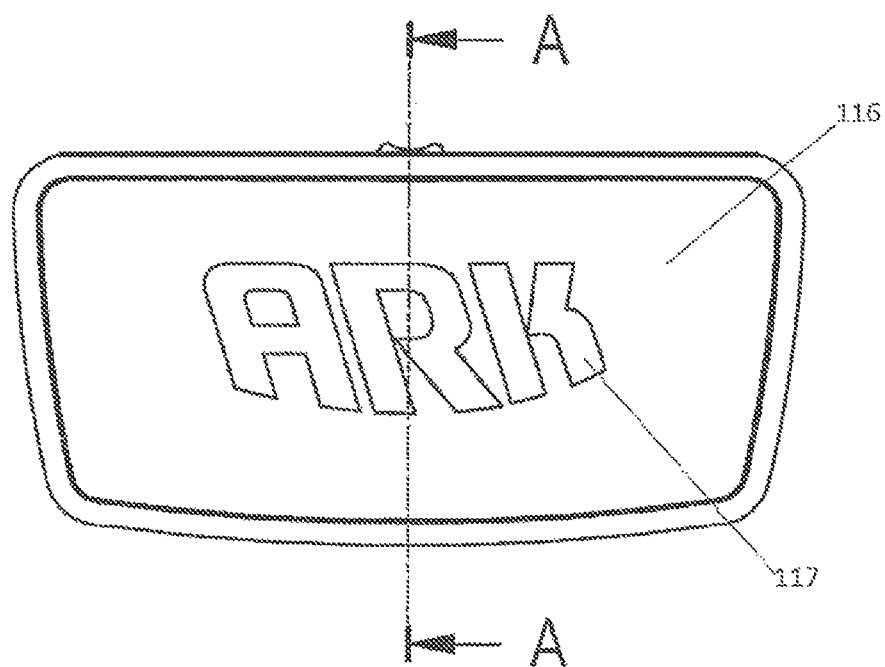
FIG. 9 is a front elevation view of a second embodiment of socket, showing a closure in a closed position.
Figure 10:
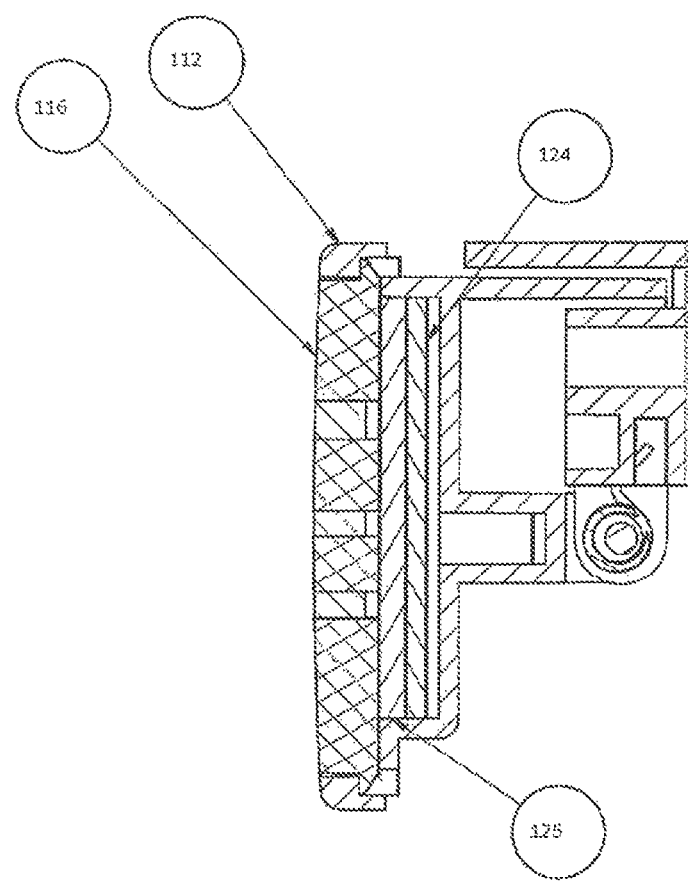
FIG. 10 is a section view cut through A-A in FIG. 9.
Figure 11:
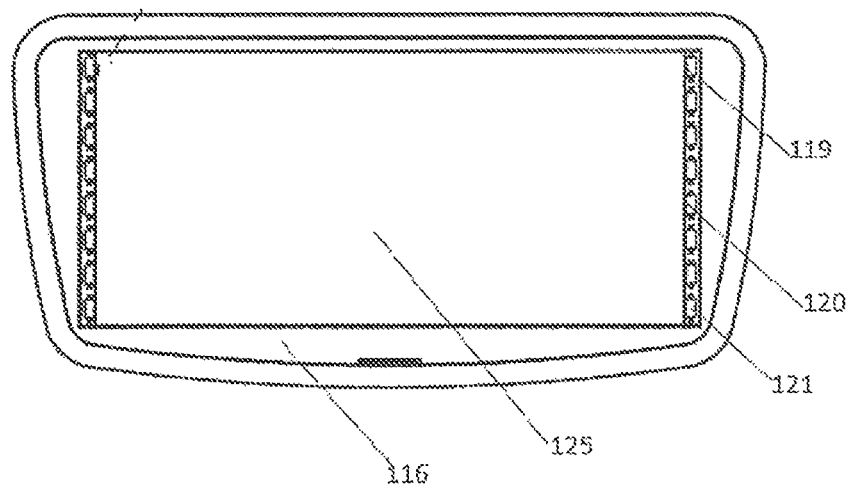
FIG. 11 is an elevation view of a diffuser for use in the closure of FIG. 9.
Figure 12:
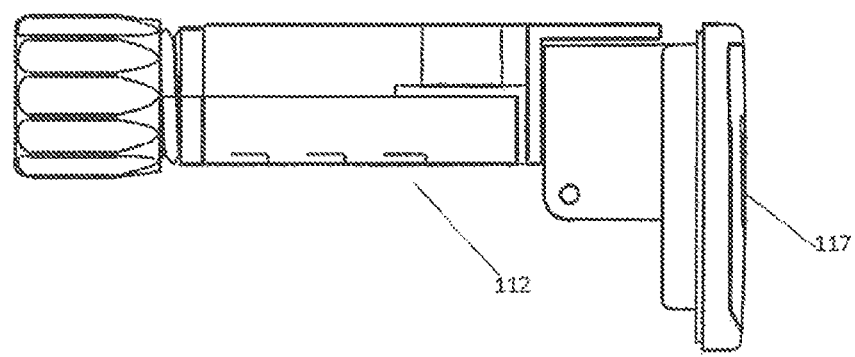
FIG. 12 is a side elevation view of the socket shown in FIG. 9.
Figure 13:
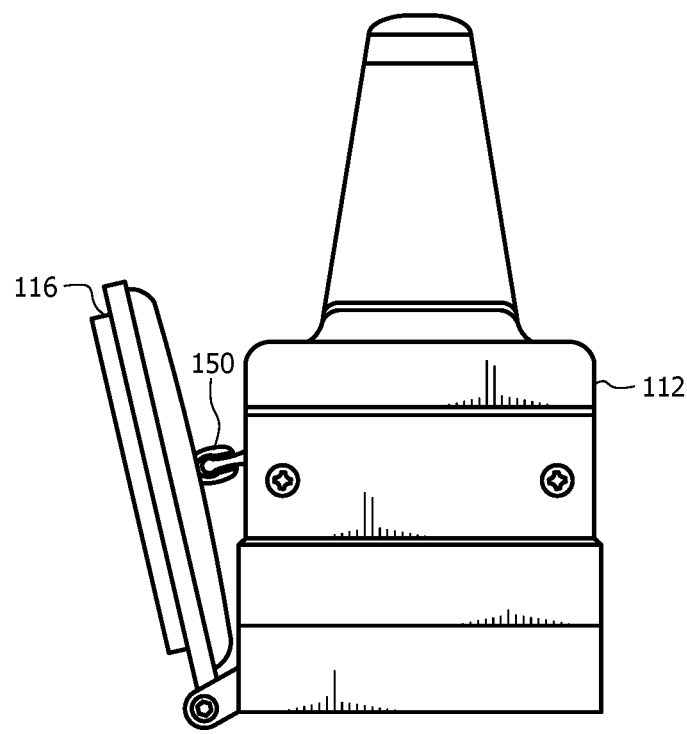
FIG. 13 is an example of one kind of catch for the illuminated closure.
Figure 14:
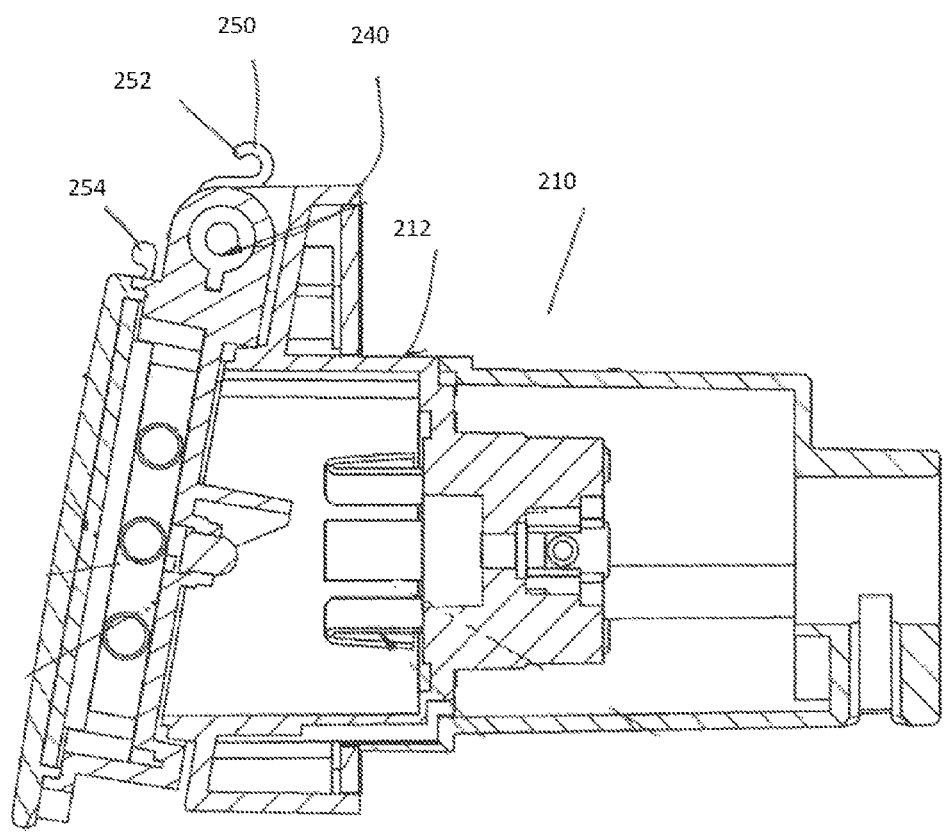
FIG. 14 is a section view similar to FIGS. 6 and 10, but of another embodiment of illuminated socket showing a slightly different style of closure illumination and a different style of catch to hold the closure in the open position.
Figure 15:
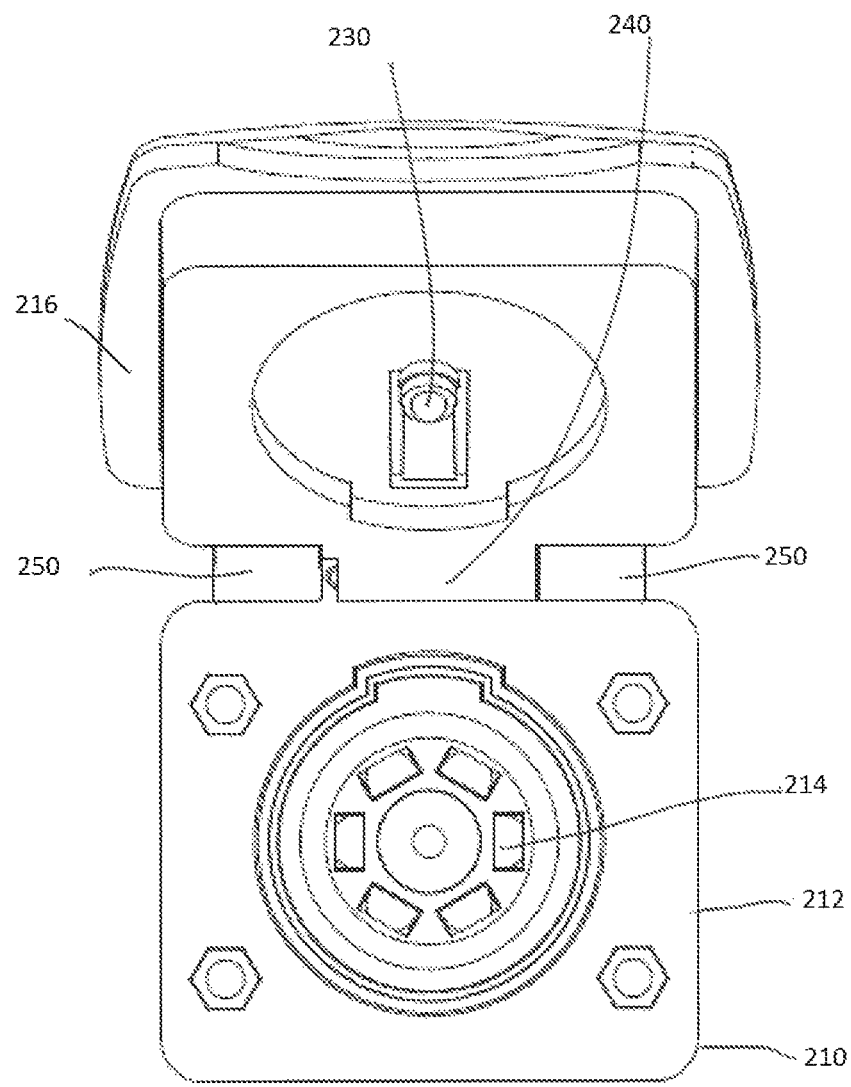
FIG. 15 is a front elevation view of the socket of FIG. 14.
Figure 16:
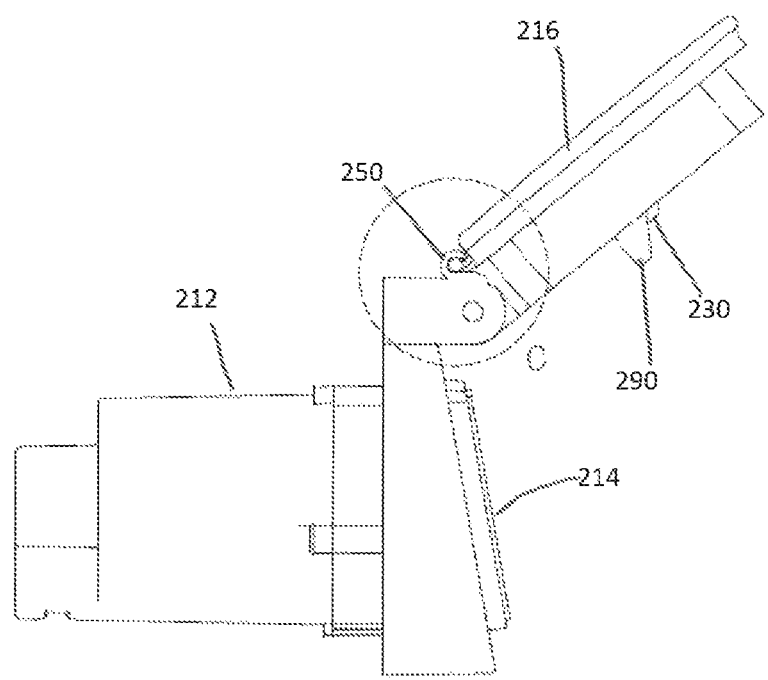
FIG. 16 is a side elevation view of the socket of FIG. 14 with the closure in the open position.
Figure 17:
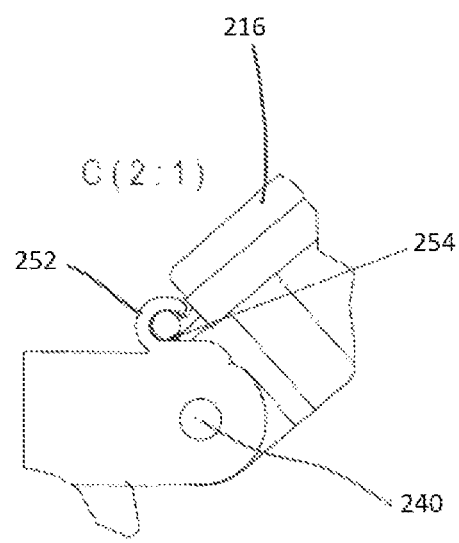
FIG. 17 is a detail view of the catch shown in FIG. 16 to hold the closure in the open position.
Figure 18:
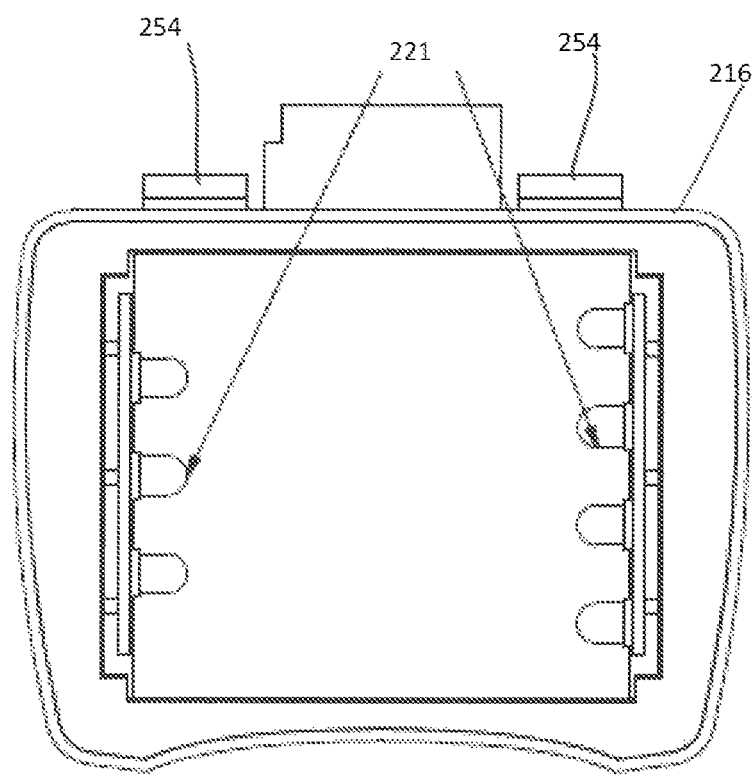
FIG. 18 is a front elevation view of the closure shown in FIGS. 14 to 17, with a diffuser removed for clarity.
Figure 19:
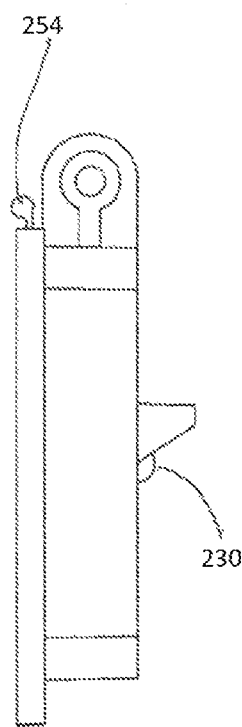
FIG. 19 is a side elevation view of the closure shown in FIG. 18, showing the cooperating catch bar to hold the closure in the catch.
Figure 20:
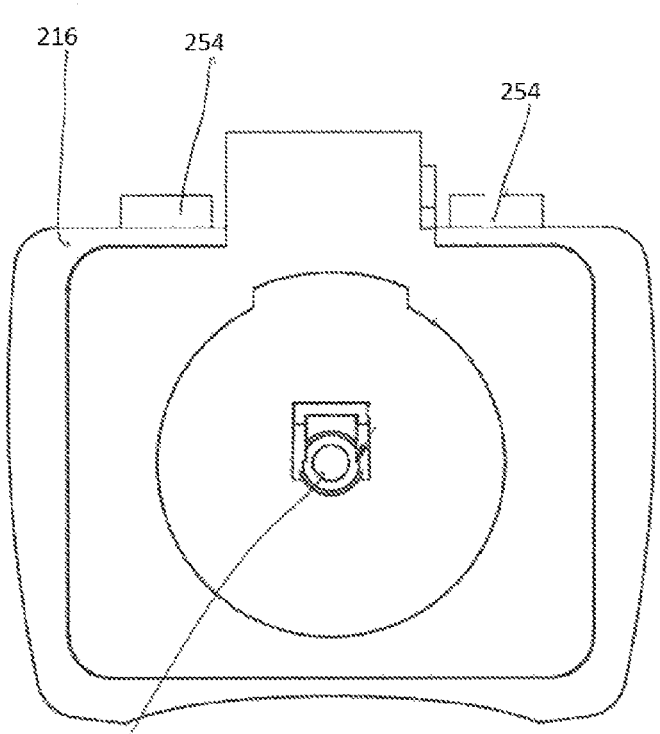
FIG. 20 is a rear elevation view of the closure shown in FIGS. 18 and 19, showing the forward-firing light on a back face of the illumination device.

The light source 19 is mounted on the illuminated closure mounts. The light source 19 includes a plurality of lamps 20 disposed in an array on the closure. In an embodiment the array includes a plurality of lamps 20, 120 disposed along one or more edges of the closure (FIGS. 8 and 11).

There are two embodiments described below and in the description of those embodiments, like numerals depict like features, so that the socket body 12 in FIGS. 1 to 8 is analogous to socket body 112 in FIGS. 9 to 12 and so on.

The plurality of lamps 20, 120 are light emitting diodes 21, 121 (LEDs) but may be in the form of incandescent globes, compact fluorescent globes, or other suitable lighting arrangements.

The light source 19, 119 includes a diffuser 25 for diffusing the light from the light source 19. The diffuser 25 includes a light pipe 26 for receiving and diffusing light from the plurality of LEDs 21. The light pipe 26 includes light inlets at each end to receive light from the plurality of LEDs and a light outlet across a front face of the light pipe.

The diffuser 25 is mounted between the PCB 24 and the lens 18 so that the diffuse light from the diffuser 25, 125 is projected substantially through the lens 18.

The light source 19 includes a forward-firing light source 30 disposed at a forward of the illuminated closure 16 and directed toward the plug receiver 14. The forward-firing light source 30 is an LED 21 but it may be in the form of incandescent globes, compact fluorescent globes, or other suitable lighting arrangement.

Figure 2:
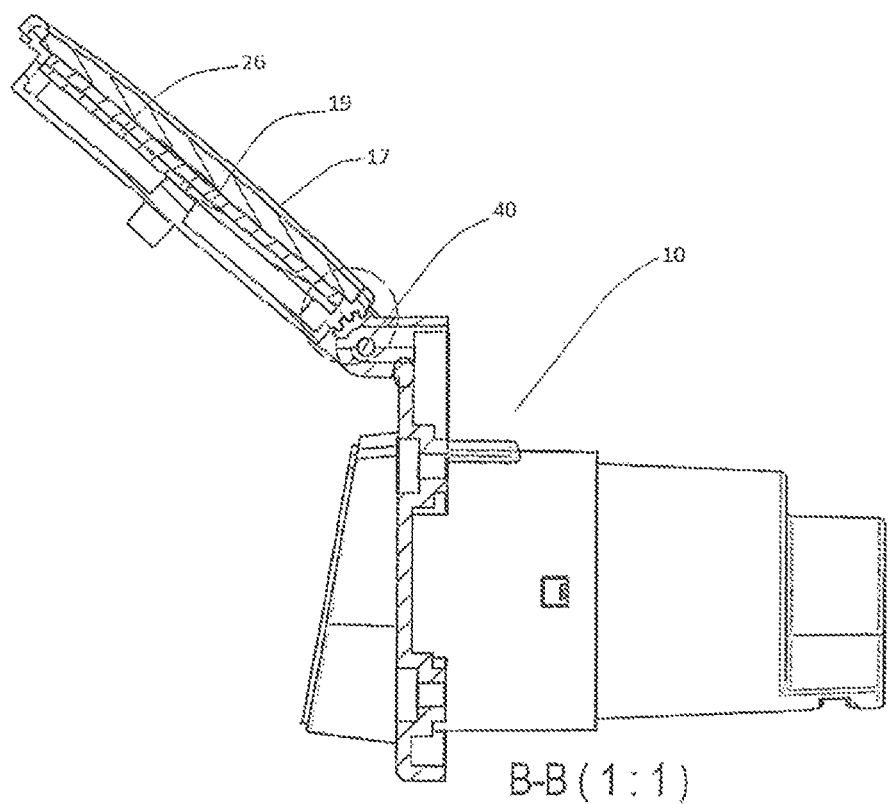
FIG. 2 is a side elevation section view of the socket of FIG. 1 through cut E-E.
Figure 3:
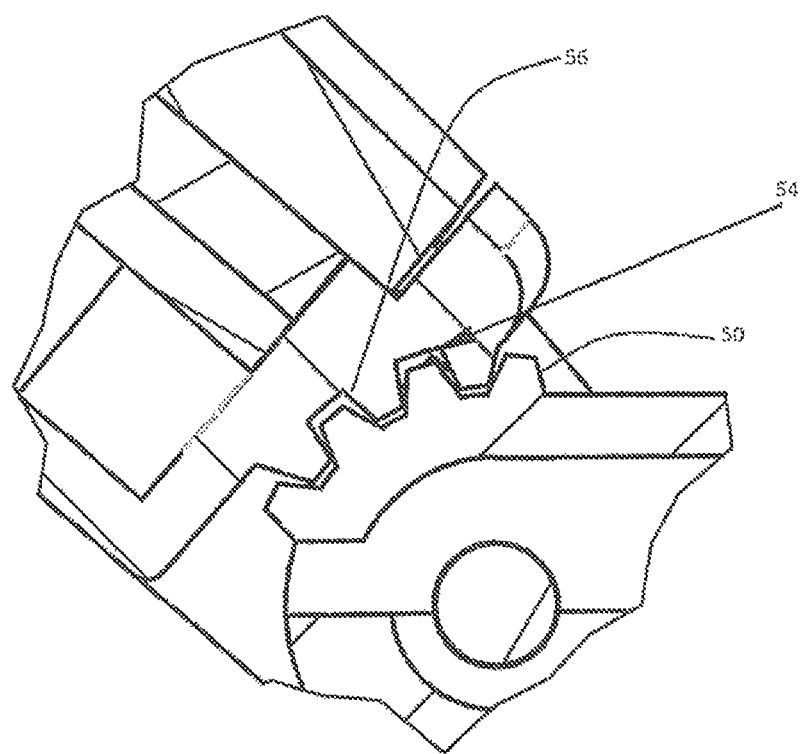
FIG. 3 is a side detail view of cooperating and retaining teeth for retaining the closure in the open position, the teeth shown in an engaged position with the closure in the open position.
Figure 4:
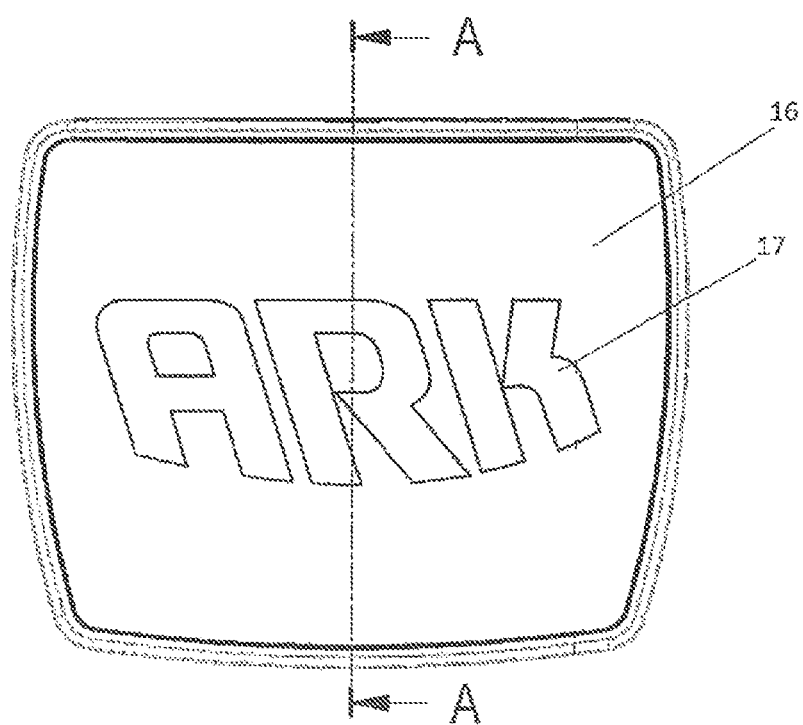
FIG. 4 is a front elevation view of the socket of FIG. 1 with the closure shown in a closed position.
Figure 5:
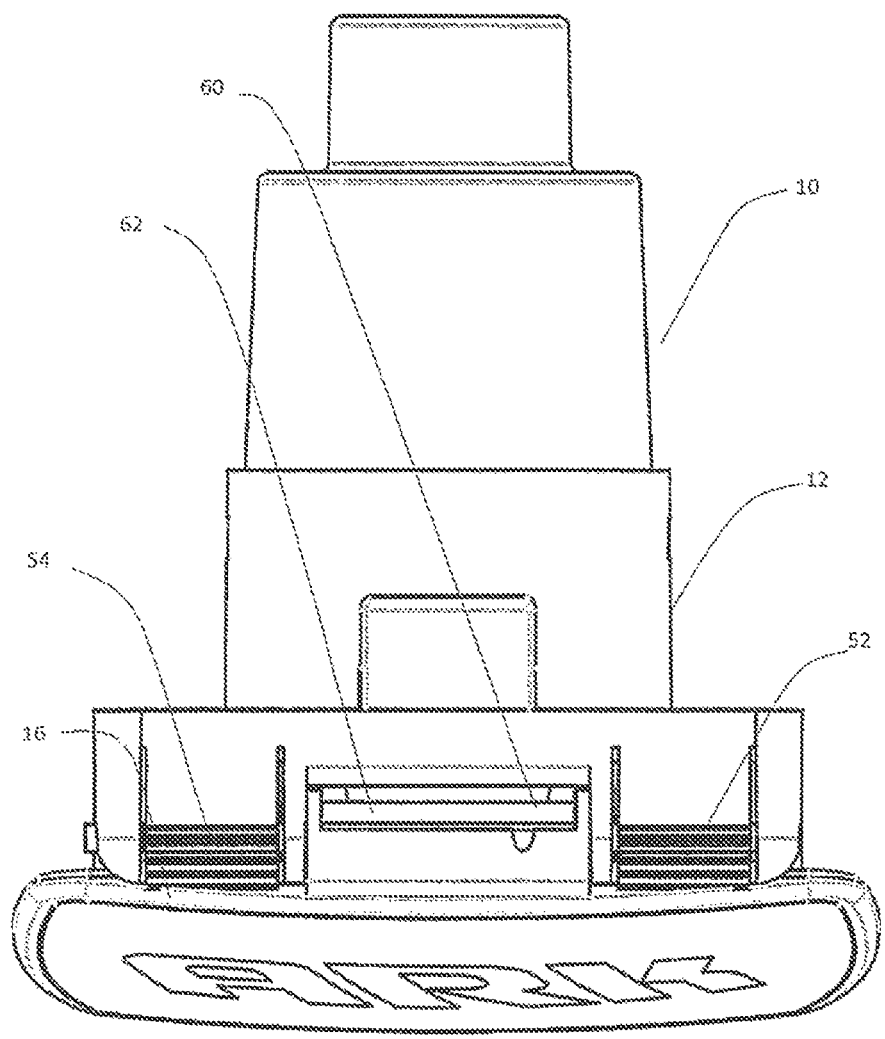
FIG. 5 is a plan view of the socket of FIG. 1.
Figure 6:
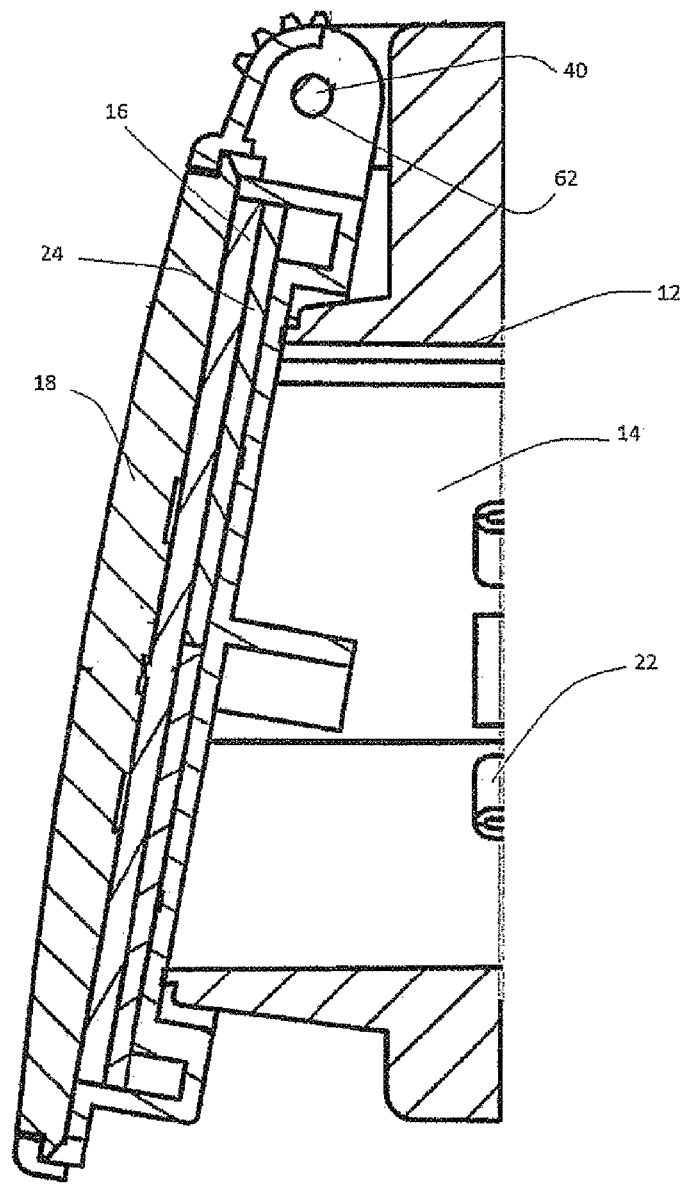
FIG. 6 is a section view of the cut through A-A shown in FIG. 4.
Figure 7:
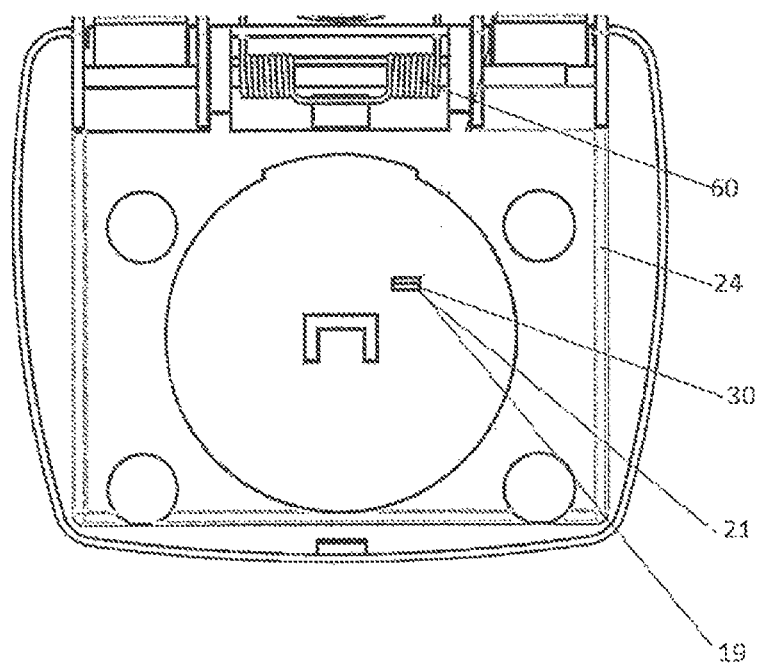
FIG. 7 is a rear elevation view of the socket with some parts removed for clarity, the Figure highlighting a forward-firing LED light for illuminating a plug recess.

The forward-firing light source 30 is mounted on a forward portion of the PCB 24 and angled so that the light from the forward-firing light source 30 illuminates the plug receiver 14 when the closure is in the open position (FIGS. 1 and 2).

The illuminated closure 16 includes a hinge 40 for moving the illuminated closure 16 from the closed position to the open position. The hinge 40 is mounted at an upper region of the socket body 12 so that the illuminated closure 16 hinges upwards so that the closure in the open position is disposed clear of the plug receiver 14 in the open position. When in the open position, the forward-firing light source 30 fires light downwards and forward into the plug receiver 14.

The illuminated closure 16 includes a catch 50 for holding the illuminated closure 16 in the open position. The catch 50 includes a retainer 52 mounted adjacent the hinge 40 for retaining a portion of the illuminated closure 16. In this embodiment, the retainer 52 includes a plurality of retaining teeth 54 to retain a kept portion of the illuminated closure 16 when it is in the open position. The kept portion of the illuminated closure 16 comprises a plurality of cooperating teeth 56 for cooperating with the retaining teeth 54 when the closure is in the open position. In operation the illuminated closure 16 can be deformed to disengage the cooperating teeth 56 from the retaining teeth 54 to release the closure from the open position and move it to the closed position.

The illuminated closure 16 includes a biasing element 60 to bias the closure to the closed position. The biasing element 60 includes a spring 62 and the spring is mounted at the hinge 40. It is to be understood that the biasing element 60 could include other suitable biasing means including a gas strut, an articulated link that folds out to support the closure 16 in an open position.

It is also to be understood that the illuminated closure 16 itself could be segmented or flexible and articulated and mounted in a track, say, so as to slide from the closed position to the open position and back. That is, the illuminated closure 16 could be a flexible element such as a film and the PCB and light element could be similarly structured.

The lens 18 is translucent to allow light to pass through from the diffuser 25. The lens 18 is not wholly translucent in the embodiments shown but actually includes translucent portions in the shape of messages, images or trade marks 17 so that the light source 19 illuminates the image, message or trade mark 17 to drivers of vehicles approaching from behind the towing vehicle.

It is to be understood that there may be other types of illumination for the illuminated closure 16, including an LED screen; illuminated e-paper, LCD screen, or a backlit display of a suitable kind on which moving imagery could be projected or displayed.

There is another embodiment shown in FIGS. 14 to 20, and just like in the embodiment shown in FIGS. 9 to 12, numerals like those in FIGS. 1 to 8 denote like features.

Therefore, an electrical socket 210 is shown, which has a socket body 212, a plug receiver 214 and an illuminated closure 216. The illuminated closure further includes a diffuser 225 for protecting and diffusing the light from the light sources 219.

The light source 219 includes a plurality of lamps 220 which are LEDs 221, some of which fire sideways, or rearwards, and at least one of which 230, fires forwards to fire at the plug receiver 214 at least when the closure is in the open position.

The socket 210 includes a catch 250 which is a catch body having a recess 252 configured to cooperate with a retainer or catch bar assembly 254 mounted on the closure 216 to hold the closure in the open position. There are two catch bars 254 mounted either side of the hinge 240 for additional stability.

A diffuser 225 is in the form of a cover plate which has a stenciled trade mark or message screen-printed on a rear face. The printing may be in fluorescent ink or other reflective print.

The diffuser may be in fluorescent material and of course transparent or translucent.

The screen printing highlights the trade mark or message, since a silhouette is highlighted by the light from the LEDs 221.

There is provided a hood 290 at least partially surrounding the LED 230 to protect it when the closure 216 is in the open position.

In this specification, where a document, act or item of knowledge is referred to or discussed, this reference or discussion is not an admission that the document, act or item of knowledge or any combination thereof was at the priority date:
a. part of common general knowledge; or
b. known to be relevant to an attempt to solve any problem with which this specification is concerned.

The word 'comprising' and forms of the word 'comprising' as used in this description do not limit the invention claimed to exclude any variants or additions.

Modifications and improvements to the invention will be readily apparent to those skilled in the art. Such modifications and improvements are intended to be within the scope of this invention.

The claims defining the invention are as follows:

1. An electrical socket configured to be mounted on a towing vehicle, the electrical socket comprising:
    a socket body;
    a plug receiver in the socket body and configured to receive a vehicle electrical plug from a towed vehicle;
    an illuminated closure for closing the plug receiver, the illuminated closure mounted on the socket body and movable between a closed position in which the closure is substantially disposed across the plug receiver to inhibit access thereto, and an open position in which the cover is disposed clear of the plug receiver, the illuminated closure further including:
    a light source mounted on the closure configured to direct light rearward of the socket body and the closure is in the closed position;
    wherein the light source is configured to illuminate the plug receiver at least when the closure is in the open position.

2. The electrical socket according to claim 1 wherein the light source includes a printed circuit board (PCB) in electrical communication with the towing vehicle so as to receive illuminating instructions from the towing vehicle and convey the instructions to the light source.

3. The electrical socket according to claim 1 wherein the light source includes a plurality of lamps disposed in an array on the closure.

4. The electrical socket according to claim 3 wherein the array includes a plurality of lamps disposed along one or more edges of the closure.

5. The electrical socket according to claim 4 wherein the plurality of lamps are light emitting diodes (LEDs).

6. The electrical socket according to claim 1 wherein the light source includes a diffuser for diffusing the light from the light source.

7. The electrical socket according to claim 1 wherein the diffuser includes a light pipe for receiving and diffusing light from the plurality of LEDs.

8. The electrical socket according to claim 7 wherein the light pipe includes light inlets at each end to receive light from the plurality of LEDs and a light outlet across a front face of the light pipe.

9. The electrical socket according to claim 6 wherein the diffuser is mounted between the PCB and a lens so that the diffuse light from the diffuser is projected substantially through the lens.

10. The electrical socket according to claim 1 wherein the illuminated closure includes a hinge for moving the illuminated closure from the closed position to the open position.

11. The electrical socket according to claim 10 wherein the hinge is mounted at an upper region of the socket body so that the closure hinges upwards to the open position and the forward-firing light source fires light downwards and forward into the plug receiver at least when the closure is in the open position.

12. The electrical socket according to claim 1 wherein the socket body includes a retainer mounted adjacent the hinge for retaining a portion of the closure when the closure is in the open position.

13. The electrical socket according to claim 12 wherein the retainer includes a catch to catch a cooperating element of the closure when the closure is in the open position.

14. The electrical socket according to claim 13 wherein the cooperating portion of the closure comprises a catch bar for cooperating with the catch when the closure is in the open position.

15. The electrical socket according to claim 1 wherein the illuminated closure includes a biasing element to bias the closure to the closed position.

16. The electrical socket according to claim 9 wherein the lens includes a lenticular treatment to make the message appear to be animated depending on the angle of viewing by a user.

17. The electrical socket according to claim 1 wherein the illuminated closure includes a display screen.

18. The electrical socket according to claim 1 wherein the illuminated closure includes a hood on a back face of the closure so as to protect a light source.

* * * * *